United States Patent [19]

Hamura et al.

[11] Patent Number: 5,548,194
[45] Date of Patent: Aug. 20, 1996

[54] CONTROL METHOD AND CONTROL DEVICE FOR A DEBURRING ROBOT

[75] Inventors: Masayuki Hamura; Kenji Aztuma, both of Oshino-mura, Japan

[73] Assignee: Fanuc Ltd., Japan

[21] Appl. No.: 374,756

[22] PCT Filed: Jun. 8, 1994

[86] PCT No.: PCT/JP94/00930

§ 371 Date: Feb. 7, 1995

§ 102(e) Date: Feb. 7, 1995

[87] PCT Pub. No.: WO94/29776

PCT Pub. Date: Dec. 22, 1994

[30] Foreign Application Priority Data

Jun. 8, 1993 [JP] Japan ................................ 5-163317

[51] Int. Cl.$^6$ ................................................ B25J 9/22
[52] U.S. Cl. ..................... 318/568.13; 318/568.1; 318/568.11; 318/568.12; 318/568.18; 318/568.24; 901/10; 901/41
[58] Field of Search ...................... 318/568.13, 568.1, 318/568.11, 568.12, 568.18, 568.2, 568.21, 568.24, 576; 901/10, 41

[56] References Cited

U.S. PATENT DOCUMENTS

| 4,617,504 | 10/1986 | Detriché | 318/576 |
| 4,894,597 | 1/1990 | Ohtomi | 318/568.21 |
| 4,993,896 | 2/1991 | Dombrowski et al. | 901/41 |
| 5,174,700 | 12/1992 | Sgarbi et al. | 901/41 |
| 5,312,212 | 5/1994 | Naumec | 901/41 |
| 5,355,639 | 10/1994 | Ferard et al. | 901/41 |

FOREIGN PATENT DOCUMENTS

| 59-208605 | 11/1984 | Japan . |
| 60-16395 | 1/1985 | Japan . |
| 60-151713 | 8/1985 | Japan . |
| 60-191308 | 9/1985 | Japan . |
| 62-285110 | 12/1987 | Japan . |
| 3-52003 | 3/1991 | Japan . |
| 4-164563 | 6/1992 | Japan . |

Primary Examiner—William M. Shoop, Jr.
Assistant Examiner—Karen Masih
Attorney, Agent, or Firm—Staas & Halsey

[57] ABSTRACT

When a deburring tool encounters a large burr near point $P'_1$ in the process in which the tip of the tool moves from point $P_1$ to point $P_2$ on a workpiece, the cutting resistance increases suddenly until it exceeds the present threshold Xth, the robot retracts the deburring tool in the direction in which the cutting resistance is reduced and brings the tool tip from point $P'_1$ to point $Q_1$. After that, the robot controls the movement of the tool so that the tool tip moves from point $Q_1$ to point $P_2$ (pattern I). When the cutting resistance exceeds the threshold Xth during the movement of the tool tip from point $Q_1$ to point $P_2$, a similar retraction movement is executed (pattern II, III). As long as the tool does not encounter such a large burr, the moving speed is controlled to a value corresponding to the cutting resistance.

20 Claims, 7 Drawing Sheets

FIG.1

FIG.2A
PATTERN 1

FIG.2B
PATTERN 2

FIG.2C
PATTERN 3

```
         WORKING CONDITION SETTING PICTURE

[1] SETTING OF OVERRIDE DIAGRAM
    X1 =  35
    X2 =  55
    X3 = 120
    Y2 =  55
[2] RETRACTION START THRESHOLD
    Xth=  90
    Y2 =  55
[3] RETRACTION POSITION
    CODE OF APPLIED COORDINATE SYSTEM    1 (Σt)
    RETRACTION VECTOR    <q>  =  ( -30, 20, 0) mm

[4] POSITION OF RESTORATION TARGET POINT
    CODE OF TARGET POINT DETERMINATION   1 (Pi+1)

[5] REPLAY CONDITION
    VALUE OF REGISTER (1)       N > 3

EXECUTE ?              Y/N
```

FIG.7

```
            TEACHING PROGRAM

LABEL  (1)
  STRAIGHT LINE   POSITION [1]    100 mm/sec   POSITIONING
  STRAIGHT LINE   POSITION [2]    100 mm/sec   POSITIONING
        . . . . . . . . . . . . . . . . . .
        . . . . . . . . . . . . . . . . . .
        . . . . . . . . . . . . . . . . . .
  STRAIGHT LINE   POSITION [9]    100 mm/sec   POSITIONING
  STRAIGHT LINE   POSITION [10]   100 mm/sec   POSITIONING

IF N>3 FOR REGISTER (1), JUMP TO LABEL (1)
```

FIG.8

CONTROL METHOD AND CONTROL DEVICE FOR A DEBURRING ROBOT

BACKGROUND OF THE INVENTION

1. Field of the Invention

The present invention relates to a control method of a robot and a control device for executing this control method, which are applicable to the deburring work for the machined parts or cast parts to be executed by a robot which operates in accordance with a taught program.

2. Description of the Related Art

The use of a robot for deburring work is a known prior art. Many attempts have been made for using a deburring robot to substantially save much manpower required for deburring work in the finishing stage of machined parts and cast parts.

When using a deburring robot, a path along the deburring line and a fixed moving speed are taught to the robot, and deburring is performed through the playback operation of the robot. In practice, however, in many instances, it is difficult to provide the best working conditions suitable for the state of burrs formed, or the properties of burrs, to be removed in the deburring work using a deburring robot.

Figure 1:
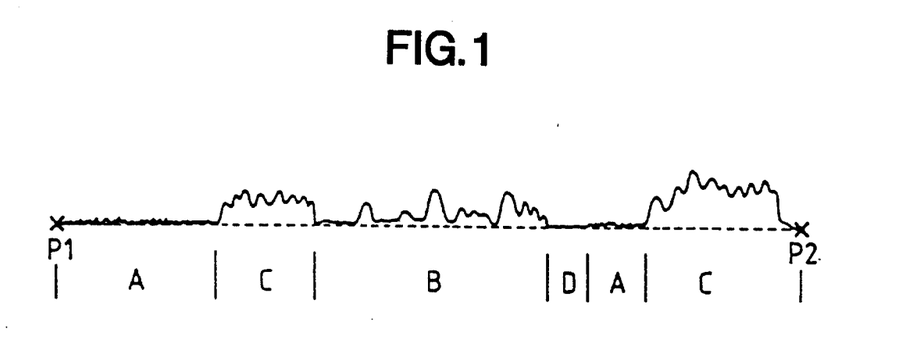
FIG. 1 is a schematic view showing part of portion with burrs formed on the periphery of a workpiece.

One of the main reasons for this is that the burrs are formed in irregular shapes and conditions on actual workpieces (machined parts, cast parts, etc. are hereinafter simply called workpieces). This situation will be explained with reference to FIG. 1. FIG. 1 schematically shows part of burrs formed along the periphery of a workpiece. $P_1$ and $P_2$ are taught points. When a deburring robot is played back, the robot carrying a deburring tool removes burrs successively while moving along the straight line (or circular arc) section $P_1P_2$. In many instances, the burrs formed on the deburring line are not uniform in size, strength, density, etc. As shown in FIG. 1, in many instances, the burrs occur not only irregularly but also in different types such as one represented by that of portion A, in which relatively small or weak burrs (hereinafter referred to simply as "small burrs") are formed, one represented by that of portion B, in which relatively small burrs and relatively large or hard burrs (hereinafter referred to simply as "large burrs"), one represented by that of portion C, in which relatively large burrs are relatively densely formed, and one represented by that of portion D, in which burrs are scarcely formed.

Essentially, it is considered to be reasonable to change the moving speed (deburring speed) or the pressing force of the deburring robot depending on the type of burr, or to take other measures.

However, the irregularity of burr formation varies depending on individual workpieces. Also, it is extremely difficult to accurately predict the types of burrs (as those represented in A to D), portion of workpiece on which burrs are formed, and area of the workpiece in which burrs are formed. For this reason, it has been a common practice to estimate the maximum burr size, maximum burr density, etc. throughout the whole deburring section of workpiece to determine the moving speed of robot based on this estimate. For example, in the case of FIG. 1, the moving speed has been selected by assuming that the whole section is in the condition of taking considerable time in removing burrs as with the case of section C. Therefore, the moving speed of the robot at the sections such as section A where burrs can be removed easily as compared with section C becomes slower than needed, which is a major factor of decreasing work efficiency.

If the robot moving speed is increased to enhance the working efficiency, burrs are removed incompletely at section C, so that finishing quality is degraded. That is to say, it is very difficult to simultaneously meet both requirements of shortening of deburring time and increasing of working accuracy.

Further, at the portion where large burrs are present like section C, the tool is strongly pressed against the burrs, so that the tool is prone to be subjected to an excessive load. A method, which has actually been practiced for avoiding the excessive load, is to install a floating mechanism on the deburring tool supporting portion. When the floating mechanism is used, however, there will be a greater chance for the tool to pass the burrs without removing them by simply moving along their contours, especially when the burrs are large in size. Besides, it is hard to estimate the ratio of unremoved burrs, and thus it is not easy to assure required machining quality on the systematic bases.

If the characteristic of the floating mechanism, in which the irregularity of burr formation can be absorbed, is utilized, and the robot path is taught so that the tool presses the workpiece a little excessively, the number of revolutions of deburring tool cutting edge decreases when a large burr is encountered during the playback deburring work, and the restoration of number of revolutions just after the tool passes through the burr portion sometimes delays. This is considered to be caused by that the tool is always kept in contact with the workpiece, since the programmed playback path of the robot has been brought closer to the workpiece. If such a phenomenon occurs, there is a possibility that deburring work immediately after the tool has passed the large burr portion will not be done properly.

Further, with the prior art, as long as the properties of the burr varies depending on the individual workpieces, it is extremely difficult to estimate the ratio of complete deburring before actually checking the result of deburring for individual workpieces. Thus, has been employed is a method such that each workpiece which has undergone the deburring process is checked so that incompletely deburred workpieces can be picked out for re-deburring. Such a method, however, is not good enough for executing the all the processes of the deburring work with high efficiency.

As described above, the conventional deburring robot technology has unsolved important problems: the moving speed of robot cannot be determined so as to rationally accommodate the irregularity of burr properties; it is difficult to assure stable working quality for the whole working path including the portion where large burrs are formed; and a suitable index for estimating the achievement of burr removal for each workpiece is not given.

SUMMARY OF THE INVENTION

An object of the present invention is to solve the above problems of the conventional arts by providing a control method and a control device for a deburring robot, in which the time required for deburring work can be reduced and also the working accuracy can be improved; a rationalized robot movement can be executed even when a large burr or a rigid burr is encountered; and a suitable index for estimating the achievement of burr removal for each workpiece can be provided.

To achieve the above object, one mode of the method of the present invention provides a method for controlling the movement of a deburring robot, in which the movement of the deburring robot is controlled so that a specific point of a deburring tool carried by the deburring robot successively passes the taught points specified by a teaching program, comprising the steps of:

(a) establishing in advance the relationship between the target moving speed of the deburring robot and the cutting resistance or pressing reaction of the deburring tool carried by the deburring robot;

(b) monitoring the cutting resistance or pressing reaction of the deburring tool on the robot side during the deburring work by the deburring tool carried by the deburring robot; and (c) controlling the target moving speed of the deburring robot to a value corresponding to the value of deburring tool cutting resistance or pressing reaction obtained by monitoring, on the basis of the relationship established in step (a).

Another mode of the method of the present invention provides a method for controlling the movement of a deburring robot, in which the movement of the deburring robot is controlled so that a specific point of a deburring tool carried by the deburring robot successively passes the taught points specified by a teaching program, comprising the steps of:

(a) monitoring the cutting resistance or pressing reaction of the deburring tool on the robot side during the deburring work by the deburring tool carried by the deburring robot;

(b) reducing the cutting resistance or pressing reaction of the deburring tool by controlling the operation of the robot so that the deburring tool is retracted a predetermined distance in the specified direction when it is detected on the robot side that the deburring tool cutting resistance or pressing reaction monitored in step (a) has exceeded a preset threshold; and (c) controlling the operation of the robot so that the specific point of deburring tool moves toward the taught position specified by a program or a predetermined position between the taught positions.

Preferably, the relationship between the target moving speed of the deburring robot and the cutting resistance or pressing reaction of the deburring tool is established in such a manner that the target moving speed of the deburring tool is at a maximum when the cutting resistance or pressing reaction of the deburring tool is not higher than a first predetermined value; the target moving speed is zero when the cutting resistance or pressing reaction is not lower than a second predetermined value which is larger than the first predetermined value; and the target moving speed takes a value which is not smaller than zero and not larger than the maximum speed when the cutting resistance or pressing reaction is between the first and second predetermined values. More specifically, the establishment of the relationship between the target moving speed of the deburring robot and the cutting resistance or pressing reaction of the deburring tool includes selecting a third predetermined value between the first and second predetermined values, and providing a speed obtained by multiplying the maximum speed by a predetermined coefficient which is not larger than 1, as the target moving speed corresponding to the third predetermined value; when the cutting resistance or pressing reaction of the deburring tool is in the range from zero to the first predetermined value, the corresponding target moving speed takes a value coinciding with the maximum speed; when the cutting resistance or pressing reaction of the deburring tool is within the range from the first predetermined value to the third predetermined value, the corresponding target speed decreases linearly from the maximum speed to a target moving speed corresponding to the third predetermined value; and when the cutting resistance or pressing reaction of the deburring tool is within the range from the third predetermined value to the second predetermined value, the corresponding target speed decreases linearly from the target moving speed corresponding to the third predetermined value to zero.

More preferably, the number of times retraction movements of the tool during the deburring work by the deburring robot is counted in advance, and if it is judged that the counted value exceeds a preset number when the deburring operation for one workpiece is completed, an alarm telling this fact is given or a command is issued to instruct the robot to perform deburring work again for that workpiece.

One mode of the control device of a deburring robot in accordance with the present invention comprises a robot control means for controlling the movement of the deburring a robot so that a specific point of a deburring tool carried by the deburring robot successively passes the taught points specified by a teaching program; a tool reaction monitor means for monitoring the cutting resistance or pressing reaction of the deburring tool during the deburring work by the deburring tool carried by the deburring robot; and tool target speed control means for controlling the target moving speed of the deburring robot to a value corresponding to the value of deburring tool cutting resistance or pressing reaction obtained by the tool reaction monitoring means, based on the relationship between the target moving speed of the deburring robot and the cutting resistance or pressing reaction of the deburring tool carried by the deburring robot, which has been established in advance.

Another mode of the control device of a deburring robot in accordance with the present invention comprises a robot control means for controlling the movement of the deburring robot so that a specific point of a deburring tool carried by the deburring robot successively passes the taught points specified by a teaching program; a tool reaction monitor means for monitoring the cutting resistance or pressing reaction of the deburring tool during the deburring work by the deburring tool carried by the deburring robot; a comparison means for comparing the monitored value obtained from the tool reaction monitoring means with a preset threshold; a tool target speed control means for controlling the target moving speed of the deburring robot to a value corresponding to the value of deburring tool cutting resistance or pressing reaction obtained by the tool reaction monitoring means, based on the relationship between the target moving speed of the deburring robot and the cutting resistance or pressing reaction of the deburring tool carried by the deburring robot, which has been established in advance, as long as it is ascertained by the comparison means that the deburring tool cutting resistance or pressing reaction does not exceed the threshold set in the comparison means; and tool retraction control means for controlling the operation of the robot so that the deburring tool is retracted a predetermined distance in the specified direction when a signal telling that the deburring tool cutting resistance or pressing reaction exceeds the threshold set in the comparison means is received from the comparison means, and controlling the operation of the robot so that the specific point of deburring tool moves toward the taught position specified by a program or a predetermined position between the taught positions.

Preferably, the control device further includes a retraction movement counting means for storing the number of times of retraction movements of the tool during the deburring work for one workpiece using the deburring robot, and a replay command means for giving an alarm or commanding the robot to perform deburring work again for that workpiece when reading the stored value of the retraction movement counting means at the time when deburring operation for that workpiece is completed and judging that the count value exceeds a preset number.

According to the present invention, having the above configuration, the moving speed of the robot can flexibly be adjusted to a local change of burr properties, so that distribution of work time can be rationalized, and both the requirements for reducing deburring time and improving working accuracy can be met simultaneously.

DETAILED DESCRIPTION OF THE PREFERRED EMBODIMENTS

First, the outline of each technical means composing the technical concept of the present invention will be described by dividing it into the following four items:

(1) Monitoring of cutting resistance force of deburring tool

At the arm tip of a deburring robot, a deburring tool having a cutting edge member to be driven for removing burrs is mounted. This deburring tool is normally a type of electric tool or pneumatic tool. If the deburring tool encounters a large burr causing the increase of cutting resistance, the drive current increases when the electric tool is used, or the air pressure increases when the pneumatic tool is used. Therefore, the cutting resistance of the deburring tool can be monitored based on the input signal etc. to a drive current display unit or an air pressure switch signal display unit attached to the tool controller.

Also, the cutting resistance of the deburring tool can be monitored by a more indirect method. For example, as conceivable indirect methods, there are one in which the pressing reaction is monitored by the floating displacement when a floating mechanism is used and the other in which the relationship between the cutting resistance and the torque command value during the movement of robot on the taught path has been investigated in advance for the appropriate axis of the robot so that the cutting resistance of the deburring tool can be estimated on the basis of this relationship. In the present invention, the detected quantity which can be considered to be a function of cutting resistance is called a "monitored cutting resistance value", regardless of direct or indirect detection. This monitored cutting resistance value of deburring tool is used for the robot moving speed control and the retraction/restoration control, which will be described later.

(2) Setting/reading of override diagram representing the relationship between the monitored cutting resistance value of deburring tool and the moving of robot As described above, there are a great variety of properties of burrs formed on individual workpieces, and accordingly there are a great variety of easiness in deburring, that is, the deburring time per unit length of deburring line should also vary accordingly. Thus, it can be considered that, in a portion where deburring is relatively easy and the deburring time per unit length of deburring line is small, the cutting resistance of the deburring tool is low, and, inversely, in a portion where deburring is relatively difficult, and the deburring time per unit length of deburring line is large, the cutting resistance of the deburring tool is high. Therefore, the work time can be distributed in the optimum manner by adjusting the moving speed of the deburring robot in accordance with the above-described monitored cutting resistance value of the deburring tool.

Normally, the moving speed of the robot is controlled by specifying its percentage to the maximum set value of moving speed, that is, by specifying the override. Therefore, the relationship between monitored cutting resistance value of the deburring tool and the robot moving speed has been established in advance in the form of an override diagram. The override value corresponding to monitored actual cutting resistance value is read during the deburring work so that the speed command based on the read override value is sent to an axis control section of the robot. Thus, the robot moving speed control in accordance with the easiness and difficulty of deburring is performed throughout the deburring line.

Figures 2A, 2B:
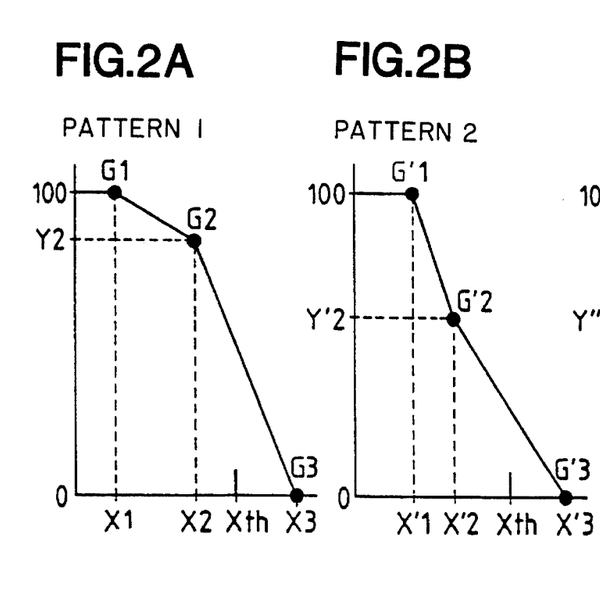
FIGS. 2A, 2B, 2C are views showing the relationship between the detected cutting resistance of deburring tool and the commanded robot moving speed, being represented by straight lines on orthogonal coordinates.
Figure 2C:
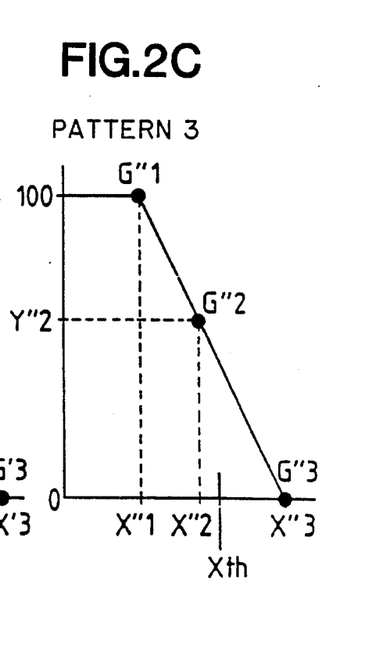

A method for specifically setting the override diagram, which is considered to be simplest and most flexible, is an override diagram setting method using a bent line function. This method will be described with reference to FIG. 2.

The patterns 1 to 3 in FIG. 2 show the example of the override diagrams represented by three types of bent line functions. The X-axis represents the monitored deburring tool cutting resistance value; and the Y-axis represents the override value. In these examples, the override value at X=0 (monitored cutting resistance value: 0) is set to 100%, and the minimum override value is set to 0.

It is reasonable for the override value corresponding to the condition in which no cutting resistance occurs to be set to 100%. Setting the minimum override value to 0 is also reasonable from the viewpoint that the robot can substantially be stopped to prevent overstress when the cutting resistance increases abnormally (however, in the retraction control, described later, retraction movement is supposed to occur normally before the robot stops).

When the bent line function override diagram of the form shown in FIG. 2 is prepared on the above premise, only four values need to be specified, and so the override diagram can be prepared in a short time. Specifically, the override diagram can be identified perfectly by specifying four coordinate values X1, X2, X3, and Y2 in all for three points G1 to G3, which define the form of the bent line function (for convenience, in patterns 2 and 3, the points are indicated by adding ' and " to each symbol, respectively).

The override diagrams of a variety of patterns can be specified by various combinations of these four values: X1

(input signal at low level), X2 (input signal at specified level), X3 (input signal at high level), and Y2 (specified override value corresponding to the input signal at specified level). Selection of a pattern should be made taking into consideration as many conditions as possible, such as the size and distribution of burrs, required finishing accuracy, the material of workpiece, etc.

As a measure, for example, it is possible to set the override diagram of pattern 1 for the deburring line mainly covering sparsely formed small burrs, pattern 2 for the deburring mainly covering densely formed large burrs, and pattern 3 for deburring line covering burrs formed with uniform density but gently varying in size, or other pattern similar to any of these patterns.

Where the monitored cutting resistance value X is given, the override value corresponding to this value can be determined by discriminating the section in which the X is included from among the sections of 0 to X1, X1 to X2, X2 to X3 and on, and determining the value of Y at the internal dividing point of the linear function. Therefore, the calculation for determining the override value corresponding to the cutting resistance monitored value can be simplified.

The setting of the bent line function override diagram by such a method and the reading of the corresponding override value can be executed easily by software processing using the normally used function of a robot controller (described later, refer to embodiment). Therefore, it can be said that the moving speed control method for the robot used in the present invention offers a very advantageous technical means in terms of the efficiency and cost of the whole work.

(3) Robot retraction/restoration control using the monitored cutting resistance value of deburring tool Even when the size and density of burrs have considerable variations, by controlling the moving speed of the robot according to the above-described override line diagram, the uniformity of working accuracy can be maintained without causing a loss of the work time. However, when the burrs are too large for the cutting force of the deburring tool, the deburring robot is retracted once, and then the robot is controlled to be guided onto the restoration path and for the target point on the taught point section, by which the deburring performance can be improved while preventing the excessive load from acting on the deburring tool.

If the deburring robot retraction/restoration control is used in combination with the robot moving speed control, a remarkable effect can be produced by the synergistic effect of the two, though the control can also be carried out singly. Here, the case in which both of the controls are combined will be described (if the override value is fixed, the deburring robot retraction/restoration control can be used singly).

Figure 3A:
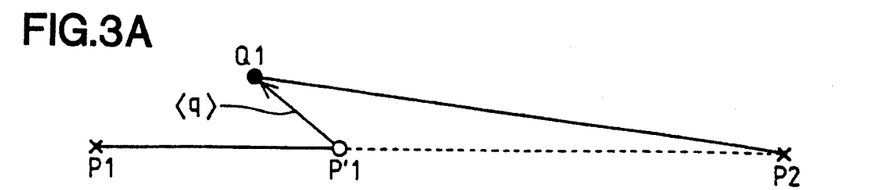
FIGS. 3A, 3B, 3C are views illustrating the movement path of the specific point of a deburring tool in the case where retraction/restoration control is carried out.
Figure 3B:
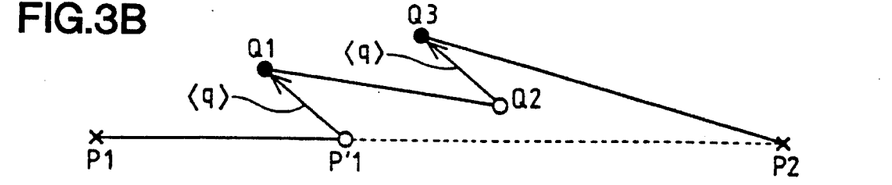
Figure 3C:
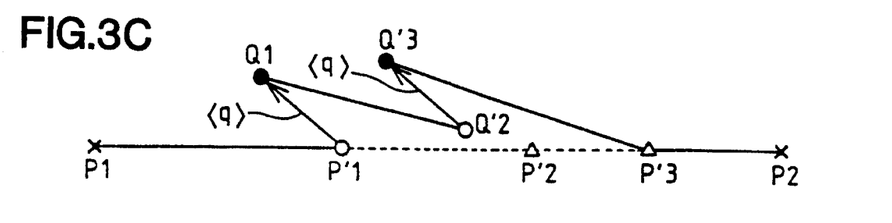

FIGS. 3A to 3C show some patterns of the retraction/restoration control. When the deburring tool supported by the deburring robot encounters a large burr, the monitored cutting resistance value increases, and the robot speed decreases in accordance with the override diagram set as shown in FIG. 2. In the case where the retraction/restoration control is used, a threshold $X_{th}$ is set for the monitored cutting resistance value, and when the monitored cutting resistance value exceeds the threshold, the robot is once retracted from the taught path, and then control is carried out so that the robot is put on the restoration path aiming at the target point specified on the taught path. This action can be repeated as many number of times as necessary. It is preferable that the threshold $X_{th}$ be set slightly before a point at which an excessive load occurs on the deburring tool. Normally, it is set at a point on the line along which the override value approaches 0 as shown in the patterns in FIG. 2.

In the case of FIG. 3A a robot path is shown for the case where the deburring tool encounters a large burr near point $P'_1$ on the teaching path, and the monitored cutting resistance value exceeds the threshold $X_{th}$. The robot goes away from the expected path at point $P'_1$ and moves toward a retraction point $Q_1$. When the retracting movement is completed, the robot again gets on the path leading to the taught point $P_2$. Afterwards, if the monitored cutting resistance value does not exceed $X_{th}$, the robot continues to move straight to point $P_2$ as shown in the figure. According to such retraction/restoration control, repetitive deburring work to remove large burrs can be executed without causing excessive loads on the deburring tool, so that the possibility of incomplete deburring is reduced.

In the case of FIG. 3, the robot follows the same path as that of the case (FIG. 3A) until the deburring tool encounters a large burr near point $P'_1$ on the taught path, the monitored cutting resistance value exceeds the threshold $X_{th}$, the robot goes away from the expected path and moves toward a retraction point $Q_1$, and then the robot again gets on a path leading to taught point $P_2$. However, if the monitored cutting resistance value x again exceeds $X_{th}$ at point $Q_2$, located halfway on the restoration path, a retracting movement to point $Q_3$ takes place again, and the robot again gets on a restoration path directed toward taught point $P_2$. Afterwards, each time the monitored cutting resistance value exceeds the threshold $X_{th}$, retraction and restoration movements are repeated.

According to the method in which retraction and restoration movements are repeated many times as shown in the case of FIG. 3B, deburring work to be repeated arbitrary number of times for removing large burrs is executed without causing excessive loads on the deburring tool, so that the possibility of incomplete deburring is further reduced.

The restoration path is not always required to be directed toward taught point $P_2$. When cutting must be performed with special care, it is preferable in some cases to control aiming at an arbitrary set point on the taught section. For example, as shown in the case (of FIG. 3C), a method in which the restoration target point is brought to a point closer to $P_2$ each time the number of times of retraction controls increases can be considered to be a form of rationalized retraction/restoration control. A method to gradually bring the target point close to $P_2$ is to put the robot on a path directed toward the midpoint of the remaining teaching sections for each restoration path. Another method is also possible, in which the restoration target point is not chosen on the teaching section. Even in this case too, the path directed toward the target point is a path aiming at some point on the teaching path, so that this point can be regarded as the restoration target point. Therefore, the present invention includes the case where the restoration target point is not chosen on the teaching section.

Although various methods can be considered in determining the retraction position and path, the optimum retraction position may be chosen by considering the properties of burrs, cutting force of the deburring tool, etc. To specify the retraction position, a position which is a specified distance away from the teaching path in the specified direction can be specified (for example, by specifying retraction vector <q>) on the specified coordinates (tool coordinate system, workpiece coordinate system, user coordinate system, etc.). Also, it is possible to set a position, which is a specified distance away from the teaching path in the direction of angle θ with respect to the working line. Further, for each retraction control, if necessary, it is possible to combine the controls for changing the threshold Xth for retraction start, retraction direction, distance, etc with one another.

(4) Means for storing the number of times of deburring robot retraction/restoration controls Generally, the number of times of deburring robot retraction/restoration movements to be executed during one teaching program playback operation tends to increase when burrs to be removed are large and formed densely on the workpiece before working. Therefore, when the number of times of retraction/restoration movements is larger than normal, there is a higher possibility of incomplete deburring.

Thus, if a method is used, in which the number of times of retraction/restoration movements is stored during deburring work so that it can be read, for example, each time one program playback operation is completed, deburring work can be done again on the same deburring line either automatically (refer to the embodiment) or manually in accordance with the number of times of retraction/restoration movements, or other similar measures can be taken.

When the number of times of retraction movements is unnecessarily large, or when the finishing accuracy is poor despite the small number of times of retraction movement, the change of the threshold Xth for retraction control start, retraction position, or override diagram can be attempted for improving the situation.

Figure 4:
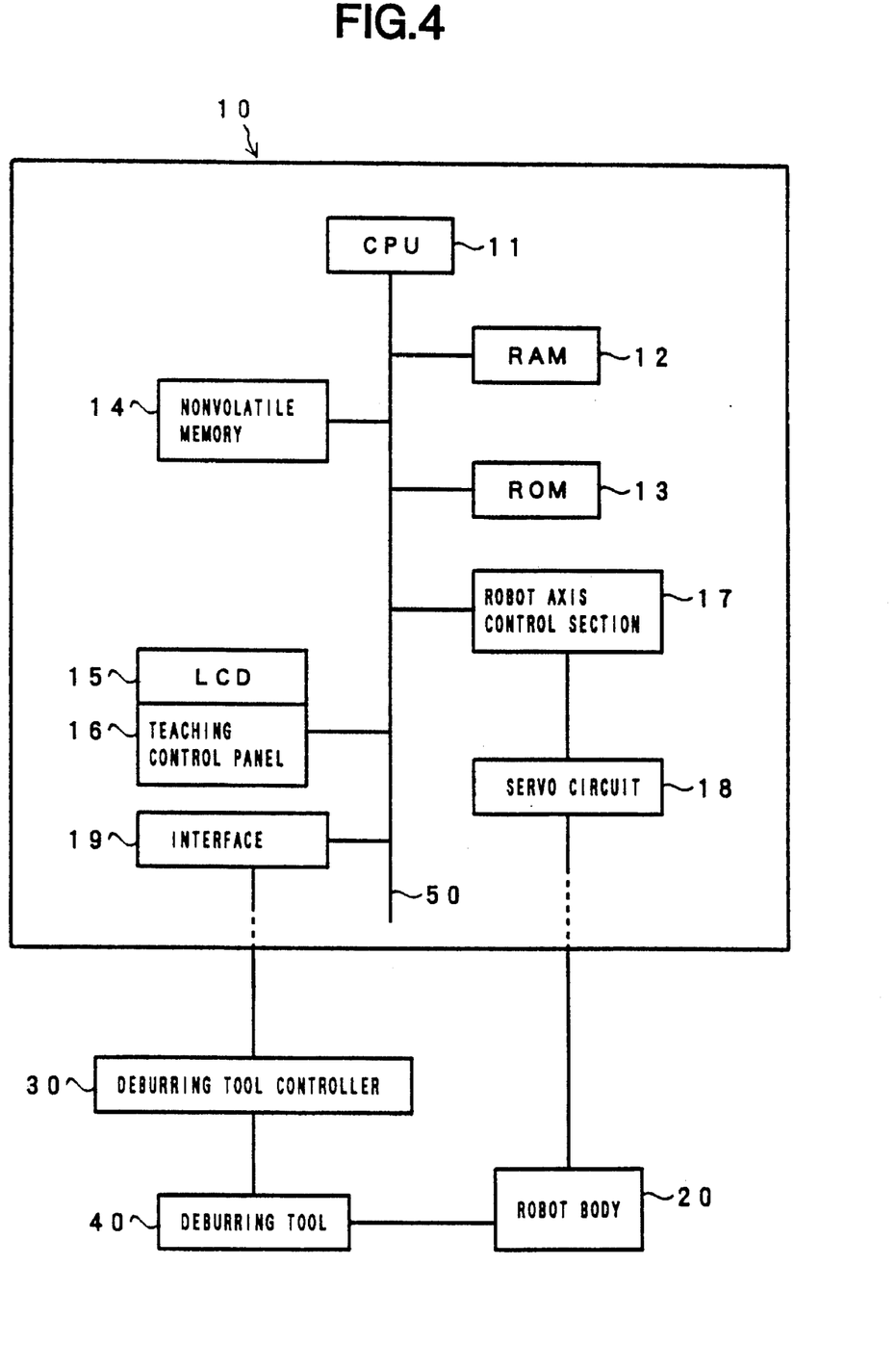
FIG. 4 is a block diagram of the principal portion of a robot system including a control device used in carrying out the deburring robot control in accordance with the present invention is shown.

FIG. 4 is a block diagram showing an example of the principal portion of a robot system including a control device used in carrying out the deburring robot control in accordance with the present invention.

In the diagram, a robot controller 10 has a central processing unit (hereinafter called CPU). Connected to the CPU via a bus 50 are a memory 12 consisting of ROM, a memory 13 consisting of RAM, a nonvolatile memory 14 consisting of CMOS, etc., a teaching control panel 16 having a liquid crystal display (LCD), a robot axis control section 17 including an interpolator, etc. to control each axis of robot, and an interface 19 connected to a deburring tool controller 30 for controlling a deburring tool 40 supported by the arm tip of a robot body 20 and to an I/O port of off-line program preparing device which is not shown. The robot axis control section 17 is further connected to the robot body 20 via a servo circuit 18.

The ROM 12 stores various programs to be executed by the CPU 11 to control the robot 20 and the robot controller 10 itself. The RAM 13 is a memory to be used for temporary storage and calculation of data. The nonvolatile memory 14 can store various parameter setting values and program data which were prepared on an off-line basis through the teaching control panel 16 or through an off-line program preparing device via the interface 19.

The configuration of the above-described deburring robot system is basically the same as that of the conventional deburring robot system. However, the system of this embodiment specially has the configuration and functions described in the following items (1) to (4):

(1) The ROM 12 and the nonvolatile memory 14 respectively store the software and the necessary related data for displaying a retraction/restoration condition setting picture shown in FIG. 6, described later, on the LCD 15 by the command from the teaching control panel 16, thereby enabling the preparation and setting of override diagram through the screen input format, the setting of retraction start threshold Xth, the setting of retraction position determination mode, the setting of restoration target point determination mode, etc.

(2) The monitored deburring tool cutting resistance signal obtained by the deburring tool controller 30 is A/D converted by the interface 19, and is ready to be sensed by the CPU 11 at any time.

(3) The ROM 12 or the nonvolatile memory 14 stores the program and the necessary related data for executing the control of the moving speed of deburring robot and the retraction/restoration control in accordance with the processing described in a flowchart described later.

(4) The nonvolatile memory 14 contains a register zone which counts up each time retraction movement is executed. CPU 11 includes a tool reaction monitoring device for monitoring a change in a cutting resistance or pressing reaction of the deburring tool during a deburring operation; a tool target speed control device for controlling a moving speed of the deburring robot based on data in the ROM 12 or nonvolatile memory 14; a comparison device for comparing the monitored value with a preset threshold and for generating a signal indicating that the monitored value has exceeded the preset threshold; a tool reaction control device for controlling the deburring operation to retract the deburring robot a predetermined distance in a specified direction based on the generated signal; a retraction movement counting device for storing a number of times the tool is retracted during a deburring operation; and a replay command device for generating an alarm signal or robot command when the number exceeds a predetermined number. Furthermore, the teaching control panel 16 includes a target moving speed setting device for setting a relationship between the target moving speed of the deburring robot and the cutting resistance or pressing reaction of the deburring tool; a device for inputting the value of the cutting resistance or pressing reaction; a device for inputting the value of the target moving speed corresponding to the value of the tool cutting resistance or pressing reaction; a threshold setting device for setting and inputting a preset threshold to be supplied to the comparison device; a retraction data setting device for setting the specified direction and the predetermined distance of the tool retraction and a tool movement target position after the tool retraction.

A procedure for executing deburring work using a robot system having the above-described configuration and functions will be described with reference to FIGS. 5 to 8.

Figure 5:
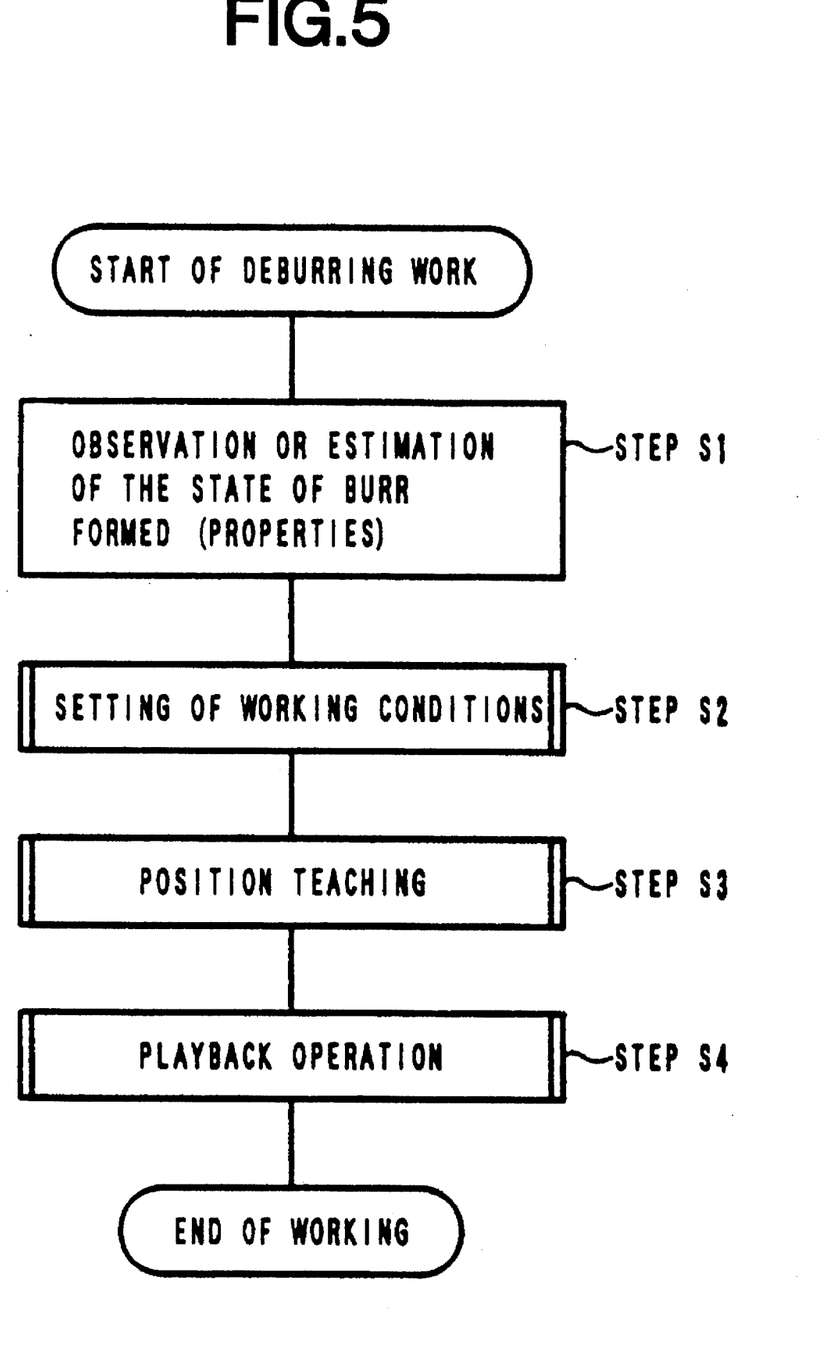
FIG. 5 is a flowchart showing the outline of the whole deburring work procedure for one workpiece.

FIG. 5 shows in a flowchart from the outline of the whole deburring work procedure for one workpiece. First, the burr size, forming density, etc. are estimated by observing some workpieces or by referring to the data concerning the previous workpiece of the same production lot or a similar workpiece (Step S1).

Next, the working condition setting format is called out on the LCD 15 by operating the teaching panel 16 in order for the working conditions suiting the condition of the formed burrs to be set (Step S3). After completing the setting of the working conditions, position teaching is performed (Step S3). The position teaching may be performed either by the touching playback method or by off-line teaching based on CAD data, etc.

After completing the above-described preparatory work, the playback operation of the robot is performed under the control based on the technical concept of the present invention to execute deburring work (Step S4). By completing playback operation, the deburring work for one workpiece is completed. Afterwards, Step S4 is, needless to say, repeated for the next workpiece to be deburred unless the change of working conditions and teaching data is required.

Next, the contents of the procedures of Steps S2, S3, and S4 will be described individually.

<Step S2> Setting of working conditions

FIG. 8 shows a working condition setting picture which is displayed on the LCD 15 by operating the teaching control panel 16 of the robot controller 10. First, an override diagram is prepared and set by referring to [1]. As described with reference to FIG. 2, an override diagram of bent line function can be prepared and set by specifying four values: X1 (input signal of low level), X2 (input signal of specified level), X3 (input signal of high level), and Y2 (override value specified at input signal of specified level). This example represents a case where the values of pattern 2 of FIG. 2 are set assuming a deburring line covering many portions with large and densely formed burrs. The numerical value of monitored cutting resistance X may be represented in appropriate linear scale units. The numerical values shown in the diagram are mere examples.

Next, the threshold Xth of monitored cutting resistance value for performing the retraction/restoration control of deburring robot is set. In FIG. 6, Xth is set to 90 so that retraction movement starts from the point at which the override value decreases to about 25% (refer to pattern 2 of FIG. 2B. In setting [3] RETRACTION POSITION, the code of applied coordinate system and the component values ($\alpha$, $\beta$, $\gamma$) of retraction vector <q> are specified. The code for applied coordinate system may be $\Sigma t=1$ for tool coordinate system, 2 for workpiece coordinate system, and 3 for user coordinate system, and so on. On the screen shown in FIG. 6, tool coordinate system $\Sigma t$ (normally, a fixed posture is assumed with respect to the deburring line) is chosen. For the component values ($\alpha$, $\beta$, $\gamma$) of retraction vector <q>, the data on the tool coordinate system $\Sigma t$, which is the applied coordinate system chosen and set, are inputted.

Figure 6:
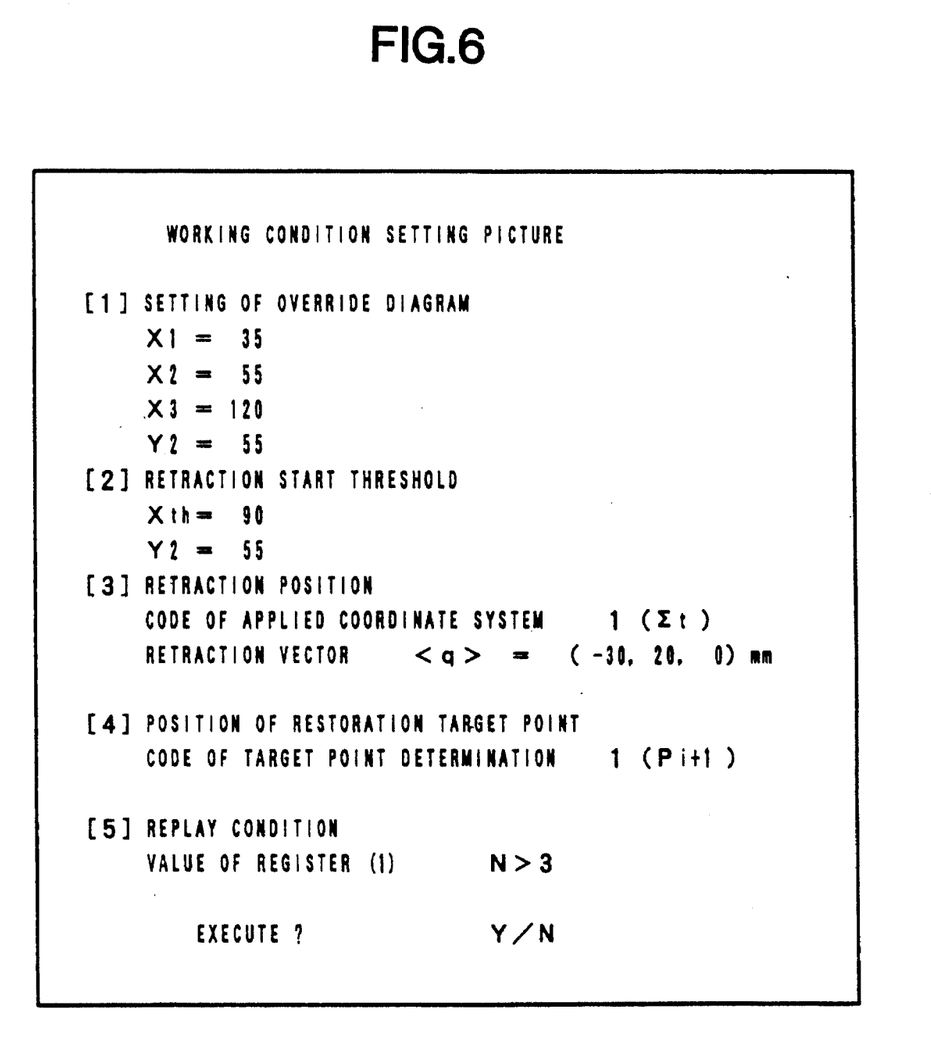
FIG. 6 is a view showing a working condition setting screen which is displayed on a display by operating a teaching control panel of a robot controller.

In FIG. 6, the displayed values (−30, 20, 0) are set assuming that the directions of X-, Y- and Z-axes of the tool coordinate system $\Sigma t$ are set to the direction of the robot travel, direction normal to the plane of the workpiece, and direction of a cutting edge of the deburring tool, respectively. For the direction and magnitude of retraction vector, values at which deburring work can be done most smoothly should be chosen freely and set, so that displayed values are, needless to say, mere examples.

In [4], the restoration target point after retraction movement is set. As described above, there are several modes for determining the restoration target point, so that these modes are coded in advance for later specification by the code number. Here, a mode in which the next taught point is the target point is chosen. As other modes, there are a mode in which a fixed point other than the next taught point on the teaching section is the target point for each restoration control, and a mode in which the restoration target point is gradually brought close to the next taught point each time the number of times of retraction/restoration controls increases.

Finally, the replay condition is set in [5]. This condition is designed to execute the playback operation of the same teaching program again, based on the judgment that the probability of poor deburring result is high in the case where the number of times of retraction/return movements has exceeded the predetermined number of times. In FIG. 6, the replay condition is set so that playback operation is executed again when the number of times N of the retraction/restoration controls stored in the register zone of the robot controller 10 exceeds 3.

Figure 7:
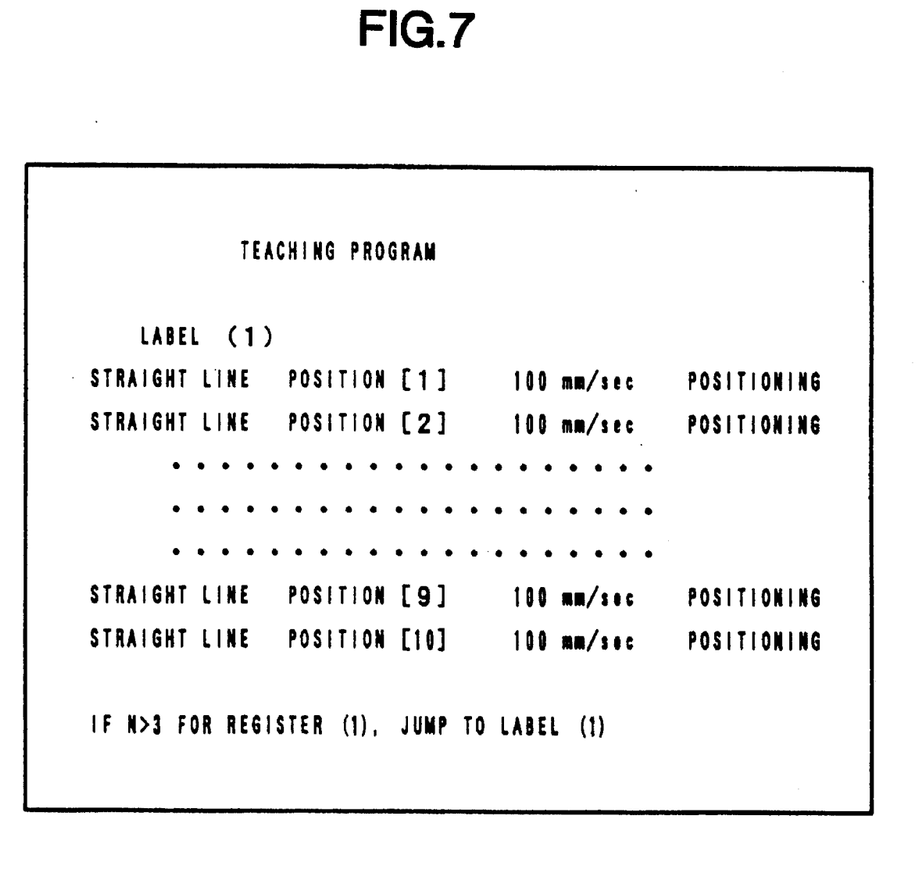
FIG. 7 is a view showing a part of teaching program which is played back when deburring work is done.

After completing the input based on the condition shown on the above screen, the contents of the inputs are checked, and Y key of the teaching control panel 16 is pressed to complete work for setting the working conditions.
<Step S3> Position teaching FIG. 7 shows a part of teaching program. Here, a case where taught points 1 to 10 are specified is shown. In this case, each taught point section is a straight line, but it may be a circular arc (however, for a circular arc section, the retraction vector and the specified data of restoration target point are changed if necessary). The robot moving speed is 100 mm/sec at 100% override. "Positioning" in operation statement specifies the execution of positioning at each taught point.

The last line of operation statement corresponds to the replay condition described in the explanation of the working condition setting picture. Therefore, both may be displayed in association with each other, or the display of the working condition setting picture may be omitted. Here, the number of times of retraction/restoration controls is counted by register (1), and the counted value is given as N. The replay condition is N>3 as displayed on the working condition setting screen. By teaching such a program, the number of times of executed retraction/restoration controls is checked each time the playback operation is completed. If the total number is 4 or more, replay is performed on the same deburring line (Refer to the next description of playback operation).
<Step S4> Playback operation (Execution of deburring)

Figure 8:
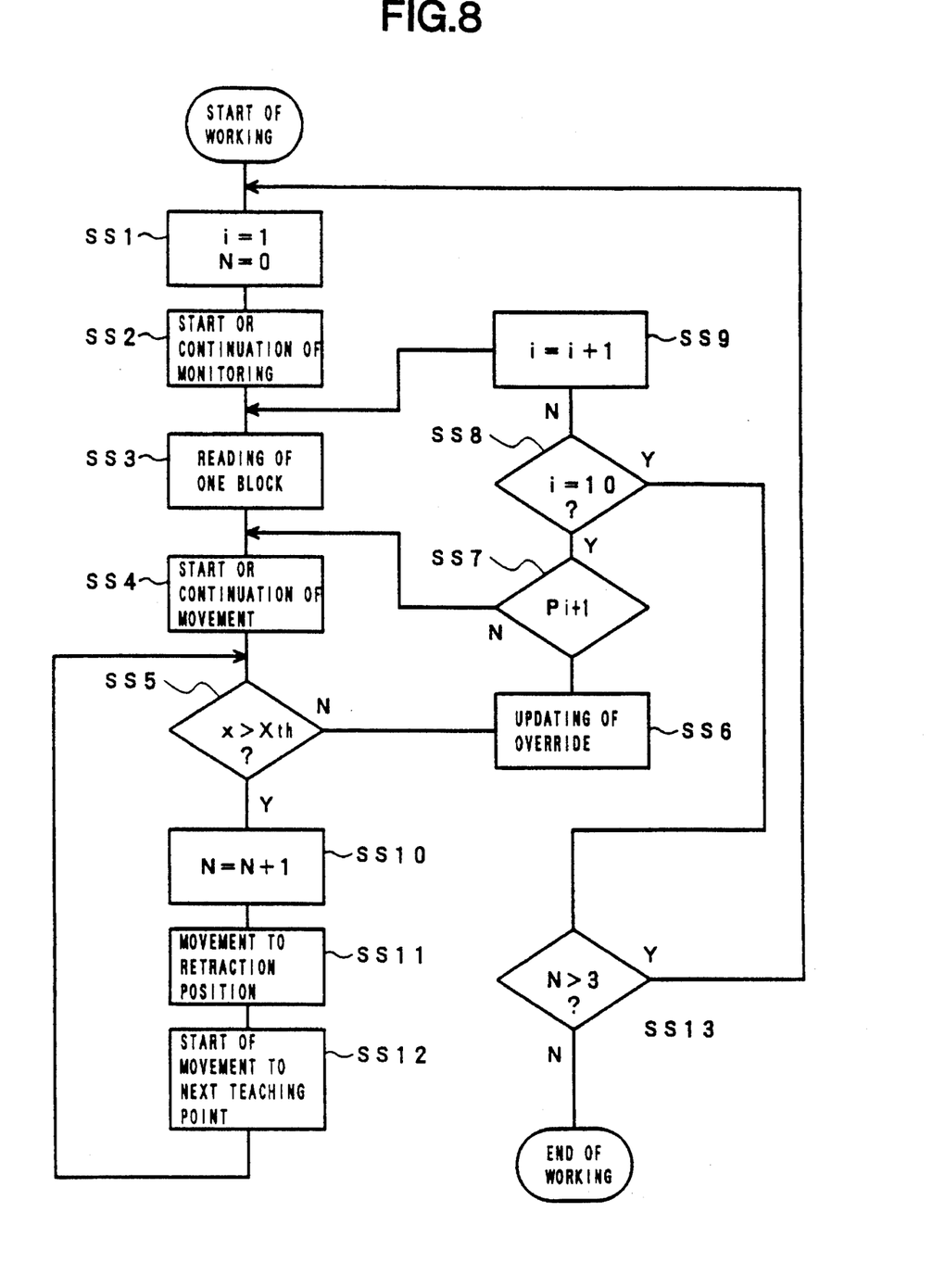
FIG. 8 is a flowchart describing the outline of processing executed by a CPU of a robot controller when the teaching program is played back (deburring work is executed).

FIG. 8 is a flowchart describing the outline of processing to be executed by the CPU 11 of the robot controller 10 when the teaching program, part of which is shown in FIG. 7, is played back (for deburring work).

First, the taught point index i is reset to 1, and the count value of register (1) to 0 (Step SS1); then the monitoring of deburring tool cutting resistance value is started (Step SS2). Further, one block of program is read (Step SS3) to cause the robot to start moving toward the next taught point ($P_{i+1}$) while executing necessary interpolation calculation, and the monitored tool cutting resistance value x is compared with the threshold Xth (Step SS5). If the result is x≦Xth, the processing proceeds to Step SS6, and if x>Xth, the processing proceeds to Step SS10.

When the monitored tool cutting resistance value is not in excess of the threshold Xth (x≦Xth), and thus retraction control is not necessary, the override value is updated in Step SS6. More particularly, the target moving speed (y %) is changed to a value corresponding to the tool cutting resistance value x. This is done by applying the monitored value x of that time to the override diagram set on the above-described working condition setting screen to determine the corresponding override value, and by updating the previous override value (initially 100%) to the determined value. After the override value is updated, the value is checked to see whether the next taught point is reached (Step SS7). If not reached (NO), the processing goes back to Step SS4 to continue the movement.

If the next taught point is reached, that is, if the judgment result in Step SS7 is YES, check is made to see whether that taught point is the final taught point (Step SS8). If it is the final taught point (YES), the processing goes to Step SS13, where it is determined whether the N value of register (1) is larger than 3. If the N value of register (1) is within 0 to 2 (NO), the working is completed. If the N value of register (1) is 4 or more, the processing goes back to Step SS1 to execute playback operation again (replay).

If the taught point reached in step SS8 is not the final taught point (NO), that is, if a taught point section requiring further deburring still remains, the taught point index i is increased by 1 (Step SS9), and the next one block of the program is read. If there is no large burrs, and the monitored deburring tool cutting resistance value is always not larger than Tth, the updating of the override value is executed, but the retraction operation will not be performed at all, so that all the working processes are completed only by the processings within the step loop described above.

On the other hand, if x>Xth is detected in Step SS5 in any of the processing cycles, the process proceeds to Step SS10, where the value N of register (1) for counting the number of times of retraction/restoration controls is counted up by 1, and the robot is retracted to the retraction position which is determined by simple calculation based on current position data of the robot and the previously set retraction vector data (Step SS11). Upon reaching the retraction position, the robot starts movement toward the next taught point which is set as the restoration target point (Step SS12).

Then, the robot approaches the next taught point while repeating the steps for checking monitored value (Step SS5), updating the override value (Step SS6), and checking whether the next taught point is reached (Step SS7). If the monitored value x exceeds Tth by the resistance of a large burr on the way to the next taught point, the processing proceeds from Step SS5 to Step SS10 again. In Step SS10, the value N is counted up by 1, and the robot retracts again (Step SS11). The calculation of retraction position in this case is also very simple (vector summing of the current position data of robot and the previously set retraction vector data).

The robot reaches the next taught point by repeating such retraction/movement controls necessary number of times (YES in Step SS7). Thereafter, passing through Steps SS8, SS9, and SS3, the deburring work of the next taught point section is started. The processing in the next taught point section is the same as the processing described above. After the workings for all taught point sections are completed, the processing goes from Step SS8 to Step SS13, where the N value of register (1) is checked. If the N value of register (1) is not smaller than 4, the processing goes back to Step SS1 to execute playback operation again (replay), and if the N value is not larger than 3, the working is completed, as described previously.

According to the present invention, even if the properties of burr are irregular, and the forming condition cannot be predicted accurately, the desired robot moving speed control can be achieved based on the monitored deburring tool cutting resistance value and the simple override diagram.

More particularly, since the robot moving speed can flexibly be adjusted to a local variation of burr properties, the distribution of work time can be rationalized, so that both the requirements for reducing deburring time and improving working accuracy can be met simultaneously.

For the portion where large and rigid burrs exist, the control such that the deburring robot is once retracted and then it resumes deburring work for the portion with large burrs (as many times as necessary) can be carried out by using the monitored value commonly used in the robot moving speed control. Therefore, the achievement of removal of large burrs can surely be increased while avoiding problems of excessive loads on deburring tool and the subsequent restoration delay in the number of revolutions of deburring cutting edge.

By using the common monitored cutting resistance value, the moving speed control and the retraction/restoration control can be executed in combination. Thus, by executing both controls in combination, a synergistic effect of these controls can be obtained, whereby it has become possible to attain the work efficiency equal to that of a skilled worker.

Further, in one mode of the present invention, the index data for estimating the achievement of burr removal for each workpiece can be obtained by providing means for storing the aforementioned number of times of retraction/restoration controls. Thus, when the possibility for burrs to be left unremoved is high, the playback operation of teaching program can be repeated either automatically (instructed by the teaching program operation statement) or manually, or other measures can be taken.

We claim:

1. A method for controlling a deburring robot holding a deburring tool to successively move the deburring tool along a plurality of taught points of a workpiece as specified by a teaching program to remove burrs on the workpiece during a deburring operation, comprising the steps of:

(a) setting a relationship between a target moving speed of said deburring robot and a cutting resistance or pressing reaction of said deburring tool;

(b) monitoring a change in the cutting resistance or pressing reaction of said deburring tool during the deburring operation; and (c) controlling an actual moving speed of said deburring robot to a speed corresponding to a value of the cutting resistance or pressing reaction of the deburring tool obtained by the monitoring step (b), based on the relationship.

2. A method for controlling a deburring robot according to claim 1, wherein the setting step includes the steps of setting the target moving speed of said deburring robot to a maximum value when the cutting resistance or pressing reaction of said deburring tool is not higher than a first predetermined value, setting the target moving speed to zero when said cutting resistance or pressing reaction is not lower than a second predetermined value which is larger than said first predetermined value, and setting the target moving speed to a value which is not smaller than zero and not larger than the maximum value when said cutting resistance or pressing reaction is between the first and second predetermined values.

3. A method for controlling a deburring robot according to claim 2, wherein the setting step further includes the steps of selecting a third predetermined value between said first and second predetermined values, and providing a speed obtained by multiplying said maximum value by a predetermined coefficient which is not higher than 1 as the target moving speed corresponding to said third predetermined value, setting said target moving speed to said maximum value when the cutting resistance or pressing reaction of said deburring tool is in the range from zero to said first predetermined value, linearly decreasing said target moving speed from said maximum value to said third predetermined value when the cutting resistance or pressing reaction of said deburring tool is in the range from said first predetermined value to said third predetermined value, and linearly decreasing said target moving speed from said third predetermined value to zero when the cutting resistance or pressing reaction of said deburring tool is in the range from said third predetermined value to said second predetermined value.

4. A method for controlling a deburring robot holding a deburring tool to successively move the deburring tool along a plurality of taught points of a workpiece as specified by a teaching program to remove burrs on the workpiece during a deburring operation, comprising the steps of:

(a) monitoring a change in a cutting resistance or pressing reaction of said deburring tool during the deburring operation;

(b) reducing the cutting resistance or pressing reaction of said deburring tool by controlling the deburring operation of said robot so that said deburring tool is retracted a predetermined distance in a specified direction when it is detected that the deburring tool cutting resistance or pressing reaction monitored in step (a) has exceeded a preset threshold; and (c) controlling said deburring robot so that said deburring tool moves towards the taught points specified by the teaching program.

5. A method for controlling a deburring robot according to claim 4, further including the steps of counting a number of retraction movements of said tool during the deburring operation, and if the counted number exceeds a preset number when the deburring operation for said workpiece is completed, generating a command to cause said robot to perform the deburring operation again for said workpiece.

6. A method for controlling a deburring robot according to claim 4, further including the steps of counting a number of retraction movements of said tool during the deburring operation, and if the counted number exceeds a preset number when the deburring operation for said workpiece is completed, generating an alarm signal.

7. A method for controlling a deburring robot holding a deburring tool to successively move the deburring tool along a plurality of taught points of a workpiece as specified by a teaching program to remove burrs on the workpiece during a deburring operation, comprising the steps of:

(a) setting a relationship between a target moving speed of said deburring robot and a cutting resistance or pressing reaction of said deburring tool;

(b) monitoring a change in the cutting resistance or pressing reaction of said deburring tool during the deburring operation;

(c) controlling an actual moving speed of said deburring robot to a speed corresponding to a value of the cutting resistance or pressing reaction of the deburring tool obtained by the monitoring step (b), based on the relationship, as long as the monitored deburring tool cutting resistance or pressing reaction does not exceed a preset threshold; and (d) reducing the cutting resistance or pressing reaction of said deburring tool by controlling the deburring operation of said robot so that said deburring tool is moved a predetermined distance in a specified direction when it is detected that the monitored deburring tool cutting resistance or pressing reaction exceeds said preset threshold, and controlling the deburring operation so that said deburring tool moves toward the taught points specified by the teaching program.

8. A method for controlling a deburring robot according to claim 7, wherein the setting step includes the steps of setting the target moving speed of said deburring robot to a maximum value when the cutting resistance or pressing reaction of said deburring tool is not higher than a first predetermined value, setting the target moving speed to zero when said cutting resistance or pressing reaction is not lower than a second predetermined value which is larger than said first predetermined value, and setting the target moving speed to a value which is not smaller than zero and not larger than the maximum value when said cutting resistance or pressing reaction is between the first and second predetermined values.

9. A method for controlling a deburring robot according to claim 8, wherein the setting step further includes the steps of selecting a third predetermined value between said first and second predetermined values for said cutting resistance or pressing reaction, and providing a speed obtained by multiplying said maximum value by a predetermined coefficient which is not higher than 1 as the target moving speed corresponding to said third predetermined value, setting said target moving speed to said maximum value when the cutting resistance or pressing reaction of said deburring tool is in the range from zero to said first predetermined value, linearly decreasing said target moving speed from said maximum value to said third predetermined value when the cutting resistance or pressing reaction of said deburring tool is in the range from said first predetermined value to said third predetermined value, and linearly decreasing said target moving speed from said third predetermined value to zero when the cutting resistance or pressing reaction of said deburring tool is in the range from said third predetermined value to said second predetermined value.

10. A control device for a deburring robot comprising:

robot control means for controlling a movement of said deburring robot carrying a deburring tool to successively move said deburring tool along a plurality of taught points of a workpiece specified by a teaching program to remove burrs on said workpiece during a deburring operation;

tool reaction monitoring means for monitoring a change in a cutting resistance or pressing reaction of said deburring tool during the deburring operation; and tool target speed control means for controlling an actual moving speed of said deburring robot to a speed corresponding to a value of the cutting resistance or pressing reaction of the deburring tool obtained by said tool reaction monitor means, based on a relationship between the target moving speed of said deburring robot and the cutting resistance or pressing reaction of said deburring tool carried by said deburring robot.

11. A control device for a deburring robot according to claim 10, wherein said robot control means further includes target moving speed setting means for setting the relationship between the target moving speed of said deburring robot and the cutting resistance or pressing reaction of said deburring tool carried by said deburring robot.

12. A control device for a deburring robot according to claim 11, wherein said target moving speed setting means includes means for inputting the value of the cutting resistance or pressing reaction and means for inputting the value of the target moving speed corresponding to the value of the tool cutting resistance or pressing reaction.

13. A control device for a deburring robot comprising:

robot control means for controlling a movement of said deburring robot carrying a deburring tool to successively move said deburring tool along a plurality of taught points of a workpiece specified by a teaching program to remove burrs on said workpiece during a deburring operation;

tool reaction monitoring means for monitoring a change in a cutting resistance or pressing reaction of said deburring tool during the deburring operation;

comparison means for comparing the monitored value obtained from said tool reaction monitoring means with a preset threshold and for generating a signal indicating that the monitored value has exceeded said preset threshold;

tool target speed control means for controlling an actual moving speed of said deburring robot to a speed corresponding to a value of the cutting resistance or pressing reaction of the deburring tool obtained by said tool reaction monitoring means, based on a relationship between the target moving speed of said deburring robot and the cutting resistance or pressing reaction of said deburring tool carried by said deburring robot, as long as said comparison means determines that the deburring tool cutting resistance or pressing reaction has not exceeded the preset threshold; and tool retraction control means for controlling the deburring operation to retract said deburring robot a predetermined distance in a specified direction when said signal is received from said comparison means, and for controlling the deburring operation of said deburring robot so that said deburring tool moves toward the taught points specified by the teaching program.

14. A control device for a deburring robot according to claim 13, wherein said robot control means further includes target moving speed setting means for setting the relationship between the target moving speed of said deburring robot and the cutting resistance or pressing reaction of said deburring tool carried by said deburring robot, threshold setting means for setting and inputting said preset threshold to be supplied to said comparison means, and retraction data setting means for setting the specified direction and the predetermined distance of said tool retraction and a tool movement target position after said tool retraction to be supplied to said tool retraction control means.

15. A control device for a deburring robot according to claim 14, wherein said robot control means further includes retraction movement counting means for storing a number of times of the retraction of said tool during the deburring operation for said workpiece using said deburring robot, and replay command means for generating a command to cause said robot to repeat said deburring operation when the number stored in the counting means exceeds a predetermined number when the deburring operation for the workpiece is completed.

16. A control device for a deburring robot according to claim 14, wherein said target moving speed setting means includes means for inputting the value of the cutting resistance or pressing reaction of the deburring tool and means for inputting the value of the target moving speed corresponding to the value of the cutting resistance or pressing reaction of the deburring tool.

17. A control device for a deburring robot according to claim 14, wherein said robot control means further includes retraction movement counting means for storing a number of times of the retraction of said tool during the deburring operation for said workpiece using said deburring robot, and replay command means for generating an alarm signal when the number stored in the counting means exceeds a predetermined number when the deburring operation for the workpiece is completed.

18. A method for controlling a deburring robot holding a deburring tool to successively move the deburring tool along a plurality of taught points of a workpiece as specified by a teaching program to remove burrs on the workpiece during a deburring operation, comprising the steps of:

(a) monitoring a change in a cutting resistance or pressing reaction of said deburring tool during the deburring operation;

(b) reducing the cutting resistance or pressing reaction of said deburring tool by controlling the deburring operation of said robot so that said deburring tool is retracted a predetermined distance in a specified direction when it is detected that the deburring tool cutting resistance or pressing reaction monitored in step (a) has exceeded a preset threshold; and (c) controlling said deburring robot so that said deburring tool moves toward a predetermined position between the taught points.

19. A method for controlling a deburring robot holding a deburring tool to successively move the deburring tool along a plurality of taught points of a workpiece as specified by a teaching program to remove burrs on the workpiece during a deburring operation, comprising the steps of:

(a) setting a relationship between a target moving speed of said deburring robot and a cutting resistance or pressing reaction of said deburring tool;

(b) monitoring a change in the cutting resistance or pressing reaction of said deburring tool during the deburring operation;

(c) controlling an actual moving speed of said deburring robot to a speed corresponding to a value of the cutting resistance or pressing reaction of the deburring tool obtained by the monitoring step (b), based on the relationship, as long as the monitored deburring tool cutting resistance or pressing reaction does not exceed a preset threshold; and (d) reducing the cutting resistance or pressing reaction of said deburring tool by controlling the deburring operation of said robot so that said deburring tool is moved a predetermined distance in a specified direction when it is detected that the monitored deburring tool cutting resistance or pressing reaction exceeds said preset threshold, and controlling the deburring operation so that said deburring tool moves toward a predetermined position between the taught points.

20. A control device for a deburring robot comprising:

robot control means for controlling a movement of said deburring robot carrying a deburring tool to successively move said deburring tool along a plurality of taught points of a workpiece specified by a teaching program to remove burrs on said workpiece during a deburring operation;

tool reaction monitoring means for monitoring a change in a cutting resistance or pressing reaction of said deburring tool during the deburring operation;

comparison means for comparing the monitored value obtained from said tool reaction monitoring means with a preset threshold and for generating a signal indicating that the monitored value has exceeded said preset threshold;

tool target speed control means for controlling an actual moving speed of said deburring robot to a speed corresponding to a value of the cutting resistance or pressing reaction of the deburring tool obtained by said tool reaction monitoring means, based on a relationship between the target moving speed of said deburring robot and the cutting resistance or pressing reaction of said deburring tool carried by said deburring robot, as long as said comparison means determines that the deburring tool cutting resistance or pressing reaction has not exceeded the preset threshold; and tool retraction control means for controlling the deburring operation to retract said deburring robot a predetermined distance in a specified direction when said signal is received from said comparison means, and for controlling the deburring operation of said deburring robot so that said deburring tool moves toward a predetermined position between the taught points.

* * * * *